United States Patent
Banal et al.

(10) Patent No.: US 7,518,828 B2
(45) Date of Patent: Apr. 14, 2009

(54) DATA STORAGE DISKETTE WITH RECESSED BASE DRIVE ZONE AND/OR TAPERED COVER LABEL ZONE

(75) Inventors: Anthony O. Banal, Fergus Falls, MN (US); Melyssa L. Evanson, Walcott, ND (US); Loryn D. Klumper, Wahpeton, ND (US); Travis C. Neumann, Rothsay, MN (US)

(73) Assignee: Imation Corp., Oakdale, MN (US)

( * ) Notice: Subject to any disclaimer, the term of this patent is extended or adjusted under 35 U.S.C. 154(b) by 555 days.

(21) Appl. No.: 11/339,429

(22) Filed: Jan. 25, 2006

(65) Prior Publication Data

US 2007/0171574 A1   Jul. 26, 2007

(51) Int. Cl.
*G11B 23/03* (2006.01)
*G11B 23/033* (2006.01)

(52) U.S. Cl. .................................................. 360/133

(58) Field of Classification Search ................. 360/133; 428/848.7; 369/291.1; 720/725–736
See application file for complete search history.

(56) References Cited

U.S. PATENT DOCUMENTS

| 4,644,435 A | 2/1987 | Nemoto et al. ............... 360/133 |
| 4,839,766 A | * 6/1989 | Kato ............................ 360/133 |
| 5,631,792 A | 5/1997 | Carlson et al. ............... 360/133 |
| 5,812,351 A | 9/1998 | Wulfing et al. ............... 360/133 |
| 6,473,266 B1 | 10/2002 | Turchin et al. ............... 360/133 |

FOREIGN PATENT DOCUMENTS

| JP | 2000011600 A | * | 1/2000 |
| JP | 2000076816 A | * | 3/2000 |

* cited by examiner

*Primary Examiner*—Craig A Renner
(74) *Attorney, Agent, or Firm*—Eric D. Levinson (57) ABSTRACT

A data storage diskette is disclosed. The diskette includes a housing and a media disk enclosed within the housing. The housing includes a base and a cover mated to the base. In this regard, the base defines an exterior surface that includes a base shutter zone that defines a base window, a drive zone that defines a drive window, and a base rib separating the base shutter zone from the drive zone, where the drive zone is recessed relative to the base rib; and the cover defines a cover window aligned with the base window.

15 Claims, 8 Drawing Sheets

DATA STORAGE DISKETTE WITH RECESSED BASE DRIVE ZONE AND/OR TAPERED COVER LABEL ZONE

THE FIELD OF THE INVENTION

The present invention relates to data storage diskettes and, more particularly, to a data storage diskette housing.

BACKGROUND OF THE INVENTION

Data storage diskettes, also known as floppy disks, have been employed for decades in computer systems. Floppy disks permit information to be written to the disk and information to be read from the disk, such that floppy disks have become a widely popular storage medium in computer systems.

A data storage diskette generally includes an outer shell or housing maintaining a media disk. The media disk is a flexible sheet of polyester film or the like, having a magnetic layer coated on at least one side. The housing normally includes a separate cover and a separate base. The cover and the base each form a window at a forward portion of the housing, and the base forms a drive window. A movable shutter is coupled to the housing and covers the cover/base windows when the diskette is not in use. When the data storage diskette is inserted into a floppy disk drive, a drive head of the disk drive enters the drive window and spins a hub of the media disk, and the shutter is displaced to "open" the base/cover windows to provide a read/write head with read/write access to the spinning media disk.

During use, information is read from, or written to, the magnetic layer on the media disk by the read/write head. The read/write head traverses the spinning media disk to magnetically read (or write) information from (or to) the media disk. In this manner, the media disk is a repository for user-selected information, and this non-volatile stored information on the media disk can be retained for many years.

When not in use, the housing protects the media disk from physical damage and debris. In addition, the housing provides an exterior surface that is useful for attaching a label that identifies the information stored on the media disk. In general, it is desired that the housing be durable enough to resist damage to the media disk when the data storage diskette is transported.

Sufficiently durable housings can be molded from polymers. However, forming covers and bases of the housing to have robust thicknesses can lead to warped covers and bases, or at least more expensive covers and bases. Removing some of the polymer from the covers and/or bases can be expensive and necessitates designing and fabricating new molds. In addition, removing some of the polymer from the covers and/or bases can give rise to a molding problem called "short shot," where an undesirable void is formed in the part due to unstable or insufficient polymer flow. Thus, there is a need for an advanced diskette housing that uses less material but is sufficiently durable.

Data storage diskettes continue to be popular data storage devices for transferring information between computer systems. Recent advances in media disk technology have resulted in data storage diskettes that are capable of storing vast volumes of information in a durable and retrievable manner. Other advancements and improvements to diskette housings will be welcomed by data storage diskette users.

SUMMARY OF THE INVENTION

One aspect of the present invention is related to a data storage diskette. The diskette includes a housing and a media disk enclosed within the housing. The housing includes a base and a cover mated to the base. In this regard, the base defines an exterior surface that includes a base shutter zone that defines a base window, a drive zone that defines a drive window, and a base rib separating the base shutter zone from the drive zone, where the drive zone is recessed relative to the base rib; and the cover defines a cover window aligned with the base window.

Another aspect of the present invention is related to a data storage diskette including a leading end and a trailing end. The data storage diskette includes a housing and a media disk enclosed within the housing. The housing includes a base and a cover. The base defines a base window adjacent to the leading end and a drive window, and the cover is mated to the base and defines an exterior surface that includes a cover shutter zone that defines a cover window aligned with the base window, a cover rib extending parallel to the leading end, and a tapered label zone recessed relative to the cover rib. In this regard, the tapered label zone tapers in thickness from the cover rib to the trailing end.

Yet another aspect of the present invention is related to a method of forming a data storage diskette housing useful for enclosing a media disk. The method includes molding a base of the housing that defines an exterior surface including a base rib and a drive zone recessed relative to the base rib, where the drive zone defines a drive window. The method additionally includes molding a cover of the housing. The method further includes coupling the base to the cover to define an enclosure for the media disk.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
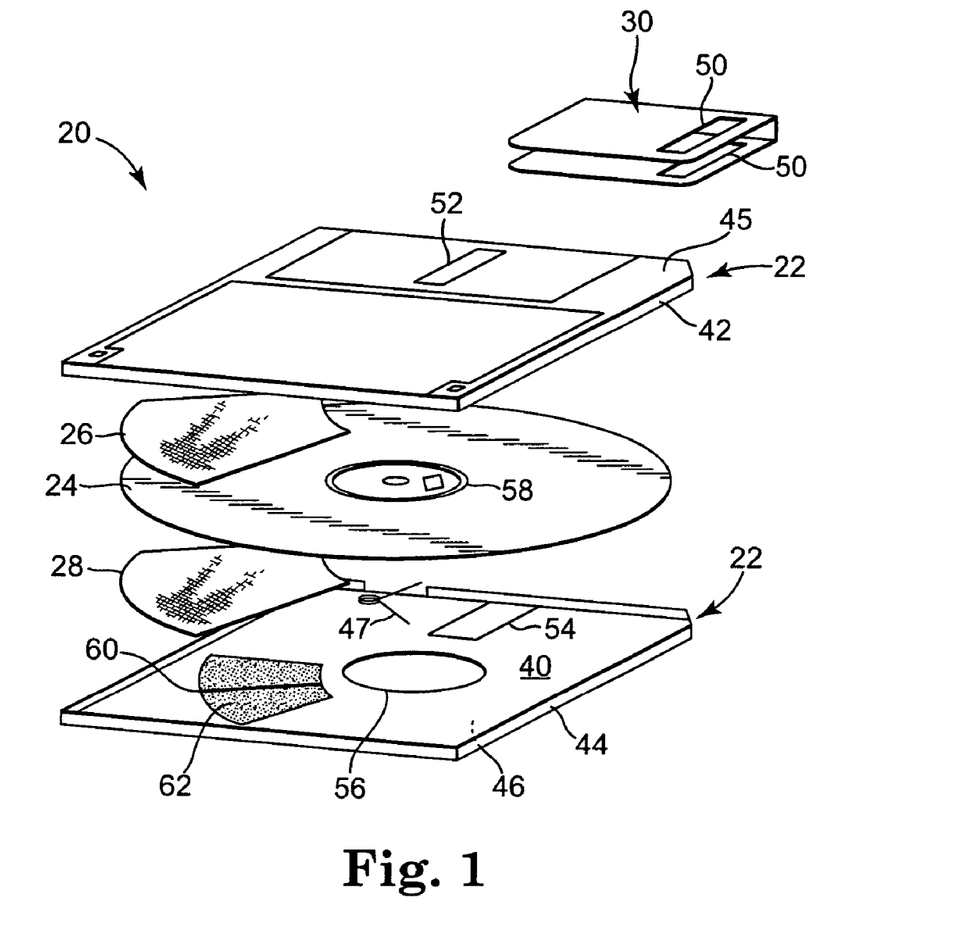
FIG. 1 illustrates a perspective, exploded view of a data storage diskette according to one embodiment of the present invention.

FIG. 1 illustrates a data storage diskette 20 according to one embodiment of the present invention. Generally, the data storage diskette 20 includes a housing 22, a media disk 24, a first fabric liner 26, a second fabric liner 28, and a shutter 30. When assembled, the media disk 24 is enclosed in a media compartment 40 formed by the housing 22.

The housing 22 is sized for reception by a typical disk drive (not shown). In this regard, one form factor for the housing 22 is a 3.5 inch form factor that has found wide acceptance in the computer system field, but should not be read as limiting the invention. Thus, in one embodiment, the housing 22 exhibits a size of approximately 3.5×3.5×0.125 inches, although other dimensions are also acceptable. The housing 22 is defined by a first housing section 42 and a second housing section 44. In one embodiment, the first housing section 42 forms a cover defining an exterior surface 45, and the second housing section 44 forms a base defining an exterior surface 46. With this specific terminology clarified, general terminology used in the Specification such as "upper," "lower," "top," "bottom," etc., is employed for purposes of illustration only and is no way limiting.

The housing 22 is formed of molded polymer. Suitable polymers for molding the housing include high impact styrene, medium impact styrene, and general purpose (clear) styrene, although polymers other than styrene are also acceptable. Suitable polymers for molding housing 22 are available from, for example, Dow Plastics, Midland, Mich.

The first and second housing sections 42 and 44, respectively, are sized to be reciprocally mated to one another to form the media compartment 40. In this regard, when the first housing section 42 and the second housing section 44 are coupled together, the shutter 30 mechanically couples about the exterior surfaces 45, 46, respectively, of the housing 22. A spring 47 is disposed within the housing 22 and couples with the shutter 30 such that the shutter 30 is movable (i.e., the spring 47 biases the shutter 30 relative to the housing 22). The shutter 30 defines opposed shutter windows 50 that are configured to align when moved with a cover window 52 formed in the first housing section 42, and a base window 54 formed in the second housing section 44.

In addition to forming the base window 54, the second housing section 44 also forms a drive window 56. The drive window 56 facilitates access to the media disk 24 by a drive portion of the disk drive (neither shown). During use, the drive portion of the disk drive enters through the drive window 56 to engage with a hub 58 centered on the media disk 24. In this manner, the disk drive couples with the hub 58 and spins the media disk 24 for selective access to media tracks distributed on the media disk 24.

The spinning media disk 24 can attract debris that could potentially interfere with the read/write process. In one embodiment, the liners 26, 28, are optionally provided to collect debris, and thus mitigate the deleterious contact of debris with the media disk 24. In another embodiment, the second housing section 44 optionally defines a lifter 60 and a plurality of projections 62 that are formed within the media compartment 40. As the media disk 24 rotates, the lifter 60 causes the second fabric liner 28 to rub against the media disk 24, thereby cleaning the media disk 24 during use.

The media disk 24 is of a type commonly known in the art and includes a coating of magnetic particles on at least one side. For example, the media disk 24 can be a polyester-based film coated on one side with a layer of magnetic material dispersed within a suitable slurry/binder system. Acceptable media disks are available, for example, from Imation Corp. of Oakdale, Minn.

Figure 2:
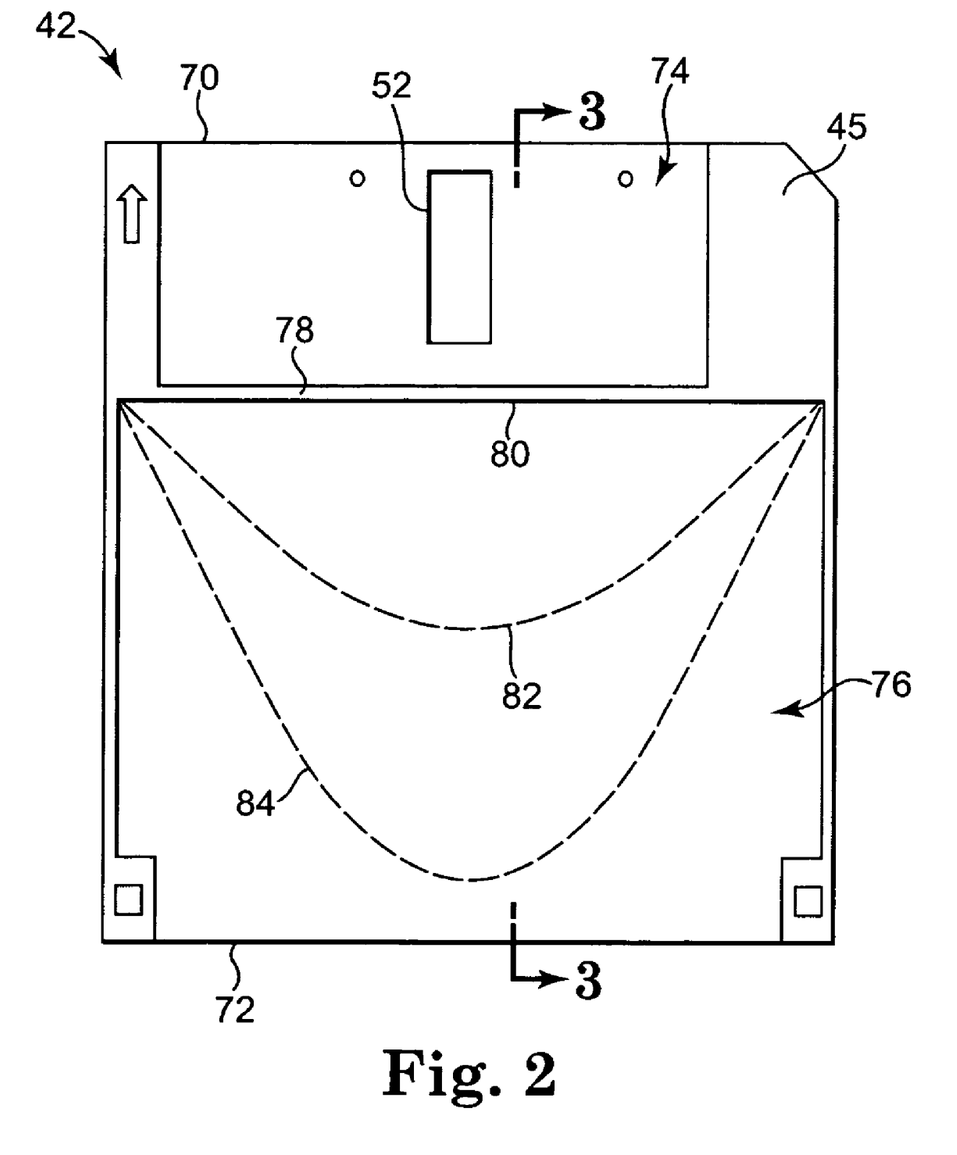
FIG. 2 illustrates a top plan view of an exterior surface of a first housing section of the data storage diskette illustrated in FIG. 1.

FIG. 2 illustrates a top plan view of the exterior surface 45 of the first housing section 42 according to one embodiment of the present invention. The first housing section 42 is isolated from the other components of the data storage diskette 20 such that the shutter 30 (FIG. 1) is not shown in FIG. 2, and the cover window 52 is unobstructed.

The first housing section 42 defines a leading end 70 and a trailing end 72 opposite the leading end 70. In one embodiment, the exterior surface 45 includes a cover shutter zone 74, a label zone 76, and a cover rib 78 separating the cover shutter zone 74 from the label zone 76. In one embodiment, the cover shutter zone 74 is recessed relative to the cover rib 78, and the label zone 76 is recessed relative to the cover rib 78 and tapers in thickness from the cover rib 78 to the trailing end 72. As illustrated, one embodiment of the invention provides the cover rib 78 extending parallel to the leading end 70 of the first housing section 42.

In one embodiment, the cover shutter zone 74 is integrally formed into the exterior surface 45 of the first housing section 42 and defines the cover window 52. In this regard, the cover shutter zone 74 defines a region of reduced thickness relative to the cover rib 78 in an area adjacent to the leading end 70.

In one embodiment, the label zone 76 is integrally formed into the first housing section 42. In this regard, the label zone 76 of the first housing section 42 is recessed relative to the cover rib 78 and defines a region (or zone) of reduced thickness relative to the rib 78. In one embodiment, the label zone 76 defines a region of constant thickness of about 0.021 inch in an area between the cover rib 78 and the trailing end 72, although other dimensions for the constant thickness are also acceptable.

In another embodiment, the label zone 76 tapers in thickness linearly from the cover rib 78 to the trailing end 72. In particular, in one embodiment, a land 80 of uniform thickness is defined adjacent to the cover rib 78, and the label zone 76 tapers in thickness linearly from the land 80 to the trailing end 72. In one embodiment, the uniform thickness of the land 80 is between 0.023 inch and 0.035 inch and the first housing section 42 is thicker across the land 80, and thinner across the trailing end 72, as more fully described below.

In one embodiment, the label zone 76 defines regions of contoured tapered curves, for example, a first contoured taper curve 82 and a second contoured taper curve 84, where the contoured taper curves 82, 84 extend from the cover rib 78 to the trailing end 72. In particular, the contoured taper curves 82, 84 define boundaries of polymer flow that form during the molding process. To this end, the contoured taper curves 82, 84 represent a streamline of polymer flow, that when cooled, represent contoured tapered curves of thickness of the polymer within the label zone 76. In one embodiment, a plurality of contoured tapered curves is distributed incrementally across the label zone 76 between the cover rib 78 and the trailing end 72. In this regard, it is to be understood that although only two contoured taper curves are illustrated in FIG. 2, multiple or even a continuum of contoured taper curves can be integrally formed in the label zone 76.

Other regions of the exterior surface 45, for example, the four corners that do not include the cover shutter zone 74 and the label zone 76, are not recessed relative to the cover rib 78. That is to say, the four corners of the first housing section 42 are relatively thicker than the zones 74, 76. In one embodiment, the housing 22 (FIG. 1) is welded at points in the four corners to secure the first housing section 42 to the second housing section 44 (FIG. 1), and the additional material in the four corners is advantageous in forming the weld.

Figure 3:
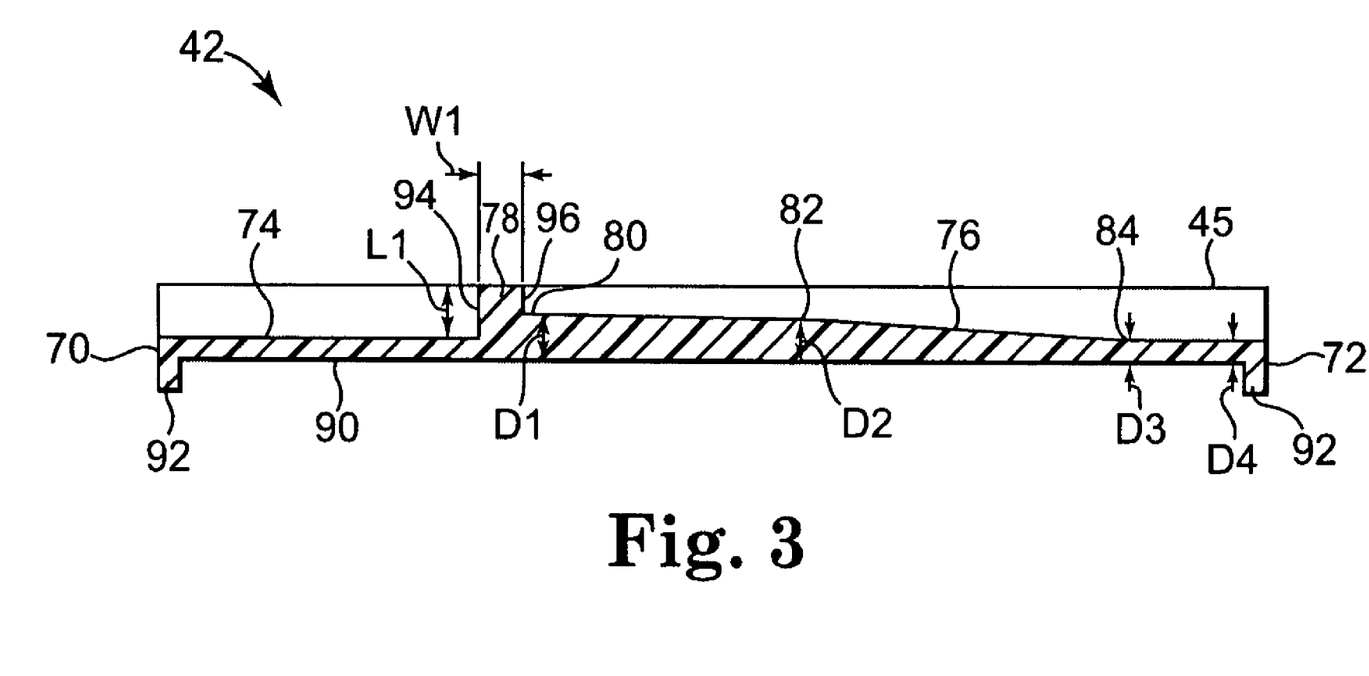
FIG. 3 illustrates a cross-sectional view of the first housing section illustrated in FIG. 2.

FIG. 3 illustrates a cross-sectional view of the first housing section 42 according to one embodiment of the present invention. In one embodiment, the first housing section 42 defines an interior surface 90 opposite the exterior surface 45, and a flange 92 disposed around a perimeter of the interior surface 90. The cover rib 78 separates the cover shutter zone 74 from the label zone 76. In this regard, the cover rib 78 defines a rib width W1. In one embodiment, the rib width W1 is less than 0.25 inch, preferably W1 is less than 0.20 inch, and more preferably the rib width W1 is between 0.05 and 0.15 inch.

As employed throughout this Specification, the term rib is defined to be a prominence having a first step face opposite a second step face, where the prominence defines a width across a top of the prominence of less than 0.25 inch. As an example, the cover rib 78 defines a first step face 94 extending away from the cover shutter zone 74, a second step face 96 extending away from the label zone 76, and a rib width WI between the faces 94, 96 and across a top of the cover rib 78 of less than 0.25 inch. It is to be understood that the faces 94, 96 can include angled faces, curved faces, faces of unequal length, and/or faces having reinforced flanges. In any regard, a rib is a prominence including two supporting faces. In contrast, a surface having a width of 0.25 inch or more forms a plateau that is distinguished from a rib. Likewise, a simple step from one lower surface up to a higher surface is a step to a plateau, and thus is not a rib as defined in this Specification.

In one embodiment, the label zone 76 tapers from the land 80 to the trailing end 72 such that a thickness of the first housing section 42 likewise tapers from the land 80 to the trailing end 72. In particular, in one embodiment, the label zone 76 of the first housing section 42 defines a land thickness D1, intermediate thicknesses D2 and D3, and a trailing end thickness D4.

With additional reference to FIG. 2, the contoured taper curves 82, 84 define a non-linear leading edge of molded polymer that extends laterally across the label zone 76. In this manner, the contoured taper curves 82, 84 define boundaries of regions of relatively different thickness relative to other portions of the label zone 76, and the contoured taper curve 82 defines a transition curve from a tapered slope related to curve 82 down to a tapered slope related to curve 84 that ultimately blends with a thickness at the trailing end thickness D4.

The cross-section illustrated in FIG. 3 is a central cross-section of the label zone 76 taken centrally through the land 80 and the contoured taper curves 82, 84. In this regard, the thickness of the first housing section 42 tapers between the land 80 and the trailing end 72 for the central cross-section illustrated in FIG. 3, although other cross-sections taken through other lateral locations of the non-linear contoured taper curves 82, 84 will result in different thicknesses for D1, D2, D3, and D4.

The cover rib 78 separates the cover shutter zone 74 from the label zone 76 and extends a distance L1 above the cover shutter zone 74. In one embodiment, the cover rib 78 extends a distance L1 beyond the cover shutter zone 74 from about 0.007 inch to about 0.014 inch.

In one embodiment, the first housing section 42 in the region of the label zone 76 defines a land thickness D1 having a thickness range from about 0.023 inch to about 0.035 inch. In one embodiment, the label zone 76 defines a trailing end thickness D4 ranging from about 0.015 inch to about 0.025 inch. In a preferred embodiment, the trailing end thickness D4 is between about 0.021 inch to 0.025 inch. In one embodiment, the thickness of the label zone 76 is tapered between the land 80 and the trailing end 72 such that the land thickness D1 is greater than the thickness D2, and the thickness D2 is greater than the thickness D3, and the thickness D3 is greater than the trailing end thickness D4.

Figure 4:
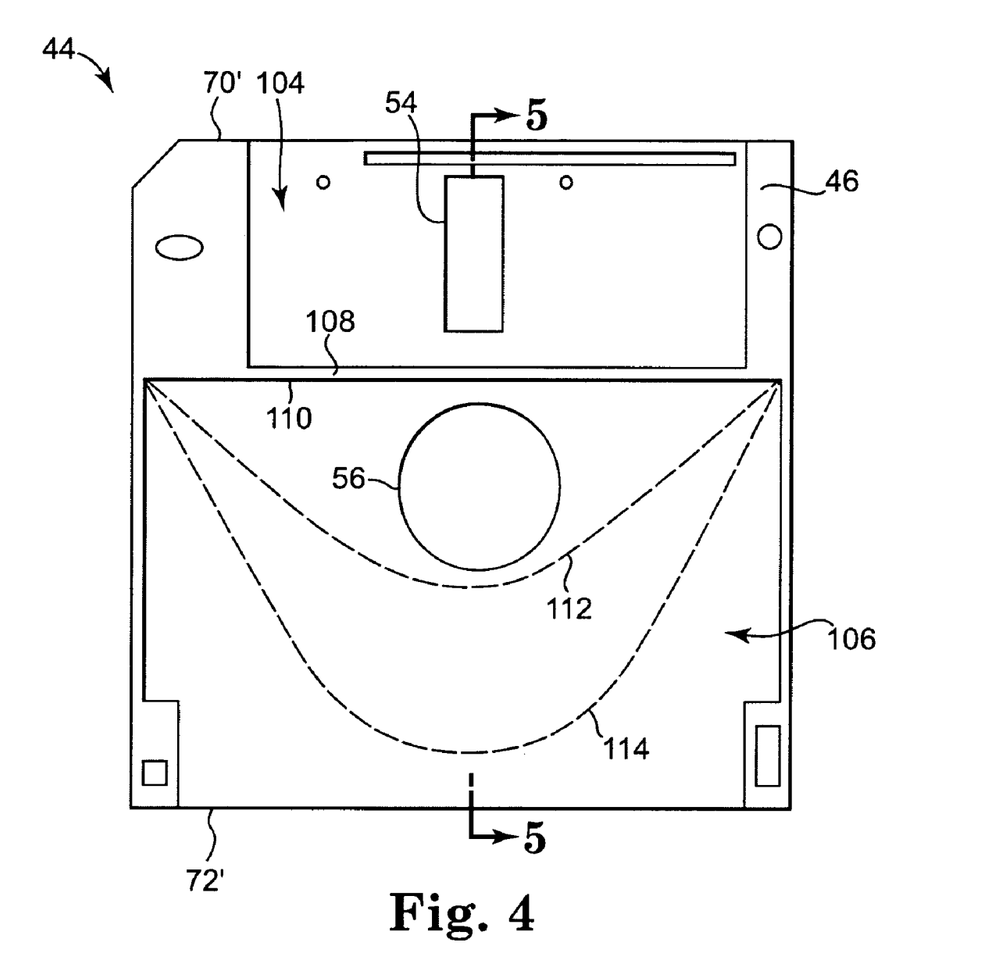
FIG. 4 illustrates a top plan view of an exterior surface of a second housing section of the data storage diskette illustrated in FIG. 1.

FIG. 4 illustrates a top plan view of the exterior surface 46 of the second housing section 44 according to one embodiment of the present invention. The second housing section 44 is isolated from the other components of the data storage diskette 20 such that the shutter 30 (FIG. 1) is not shown in FIG. 4, and the base window 54 is unobstructed.

The second housing section 44 defines a leading end 70' and a trailing end 72' opposite the leading end 70'. In one embodiment, the exterior surface 46 includes a base shutter zone 104, a drive zone 106, and a base rib 108 separating the base shutter zone 104 from the drive zone 106. In one embodiment, the base shutter zone 104 is recessed relative to the base rib 108, and the drive zone 106 is recessed relative to the base rib 108 and tapers in thickness from the base rib 108 to the trailing end 72'. In this regard, the base shutter zone 104 defines the base window 54, and the drive zone 106 defines the drive window 56. As illustrated, one embodiment of the invention provides the base rib 108 extending parallel to the leading end 70' of the second housing section 44.

In one embodiment, the base shutter zone 104 is integrally formed into the exterior surface 46 of the second housing section 44. In this regard, the base shutter zone 104 defines a region of reduced thickness relative to the base rib 108 in an area adjacent to the leading end 70'.

In one embodiment, the drive zone 106 is integrally formed into the second housing section 44. In this regard, the drive zone 106 defines a region of reduced thickness relative to the base rib 108 in an area adjacent to the trailing end 72'. In one embodiment, the drive zone 106 defines a region of constant thickness of about 0.021 inch in an area between the base rib 108 and the trailing end 72', although other dimensions for the constant thickness are also acceptable.

In another embodiment, the drive zone 106 tapers in thickness from the base rib 108 to the trailing end 72'. In particular, in one embodiment, a base land 110 of uniform thickness is defined adjacent to the base rib 108, and the drive zone 106 tapers in thickness from the base land 110 to the trailing end 72'. In one embodiment, the uniform thickness of the base land 110 is between 0.023 inch and 0.035 inch and the second housing section 44 is thicker across the base land 110, and thinner across the trailing end 72'.

In one embodiment, the drive zone 106 defines regions of contoured tapered curves, for example, a first contoured tapered curve 112 and a second contoured tapered curve 114, where the contoured tapered curves 112, 114 extend from the base rib 108 to the trailing end 72'. Similar to the contoured taper curves 82, 84 (FIG. 2), the contoured tapered curves 112, 114 represent a streamline of polymer flow, that when cooled, form contoured tapered curves of thickness of polymer within the drive zone 106. In one embodiment, a plurality of contoured tapered curves is distributed incrementally across the drive zone 106 between the base rib 108 and the trailing end 72'. In this regard, it is to be understood that although only two contoured tapered curves are illustrated in FIG. 4, multiple or even a continuum of contoured tapered curves can be integrally formed in the drive zone 106.

Figure 5:
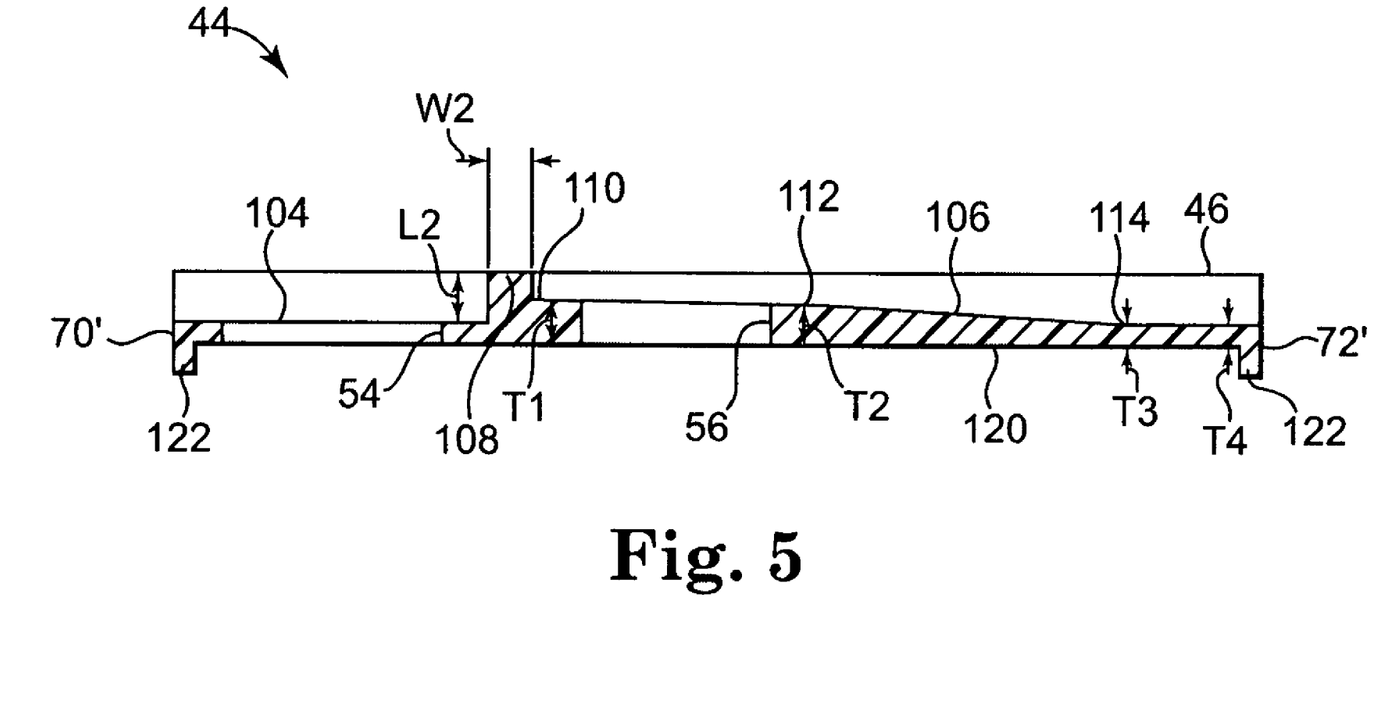
FIG. 5 illustrates a cross-sectional view of the second housing section illustrated in FIG. 4.

FIG. 5 illustrates a cross-sectional view of the second housing section 44 according to one embodiment of the present invention. In one embodiment, the second housing section 44 defines an interior surface 120 opposite the exterior surface 46, and a flange 122 disposed about a perimeter of the interior surface 120. The base rib 108 is a rib as defined above and separates the base shutter zone 104 from the drive zone 106.

In this regard, the base rib 108 defines a rib width W2. In one embodiment, the rib width W2 is less than 0.25 inch, preferably W2 is less than 0.20 inch, and more preferably the rib width W2 is between 0.05 and 0.15 inch.

In one embodiment, the drive zone 106 tapers from the base land 110 to the trailing end 72' such that a thickness of the second housing section 44 likewise tapers from the base land 110 to the trailing end 72'. In particular, in one embodiment, the drive zone 106 of the second housing section 44 defines a land thickness T1, intermediate thicknesses T2 and T3, and a trailing end thickness T4.

With additional reference to FIG. 4, the contoured tapered curves 112, 114 define a non-linear leading edge of polymer that extends laterally across the drive zone 106. In this manner, the contoured taper curve 112 is relatively thicker than the contoured taper curve 114, and the contoured taper curves 112, 114 taper in thickness from the land thickness T1 down to the trailing end thickness T4. Thus, the contoured taper curves 112, 114 define boundaries of regions of relatively different thickness relative to other portions of the drive zone 106, and the contoured taper curve 112 defines a transition curve from a tapered slope related to curve 112 down to a tapered slope related to curve 114 that ultimately blends with a thickness at the trailing end thickness T4.

The cross-section illustrated in FIG. 5 is a central cross-section of the drive zone 106 taken centrally through the base land 110 and the contoured tapered curves 112, 114. In this regard, the thickness of the drive zone 106 tapers between the base land 110 and the trailing end 72' for the central cross-section illustrated in FIG. 5, although it is to be understood that other cross-sections taken through other lateral locations of the non-linear contoured tapered curves 112, 114 will result in different thicknesses for T1, T2, T3, and T4.

The base rib 108 separates the base shutter zone 104 from the drive zone 106 and extends a distance L2 above the base shutter zone 104. In one embodiment, the base rib 108 extends a distance L2 beyond the base shutter zone 104 from about 0.007 inch to about 0.014 inch.

In one embodiment, the second housing section 44 in the region of the drive zone 106 defines a base land thickness T1 having a thickness range from about 0.023 inch to about 0.035 inch. In one embodiment, the drive zone 106 defines a trailing end thickness T4 ranging from about 0.015 inch to about 0.025 inch. In a preferred embodiment, the trailing end thickness T4 is about 0.024 inch. In one embodiment, the thickness of the drive zone 106 is tapered between the base land 110 and the trailing end 72' such that the land thickness T1 is greater than the thickness T2, and the thickness T2 is greater than the thickness T3, and the thickness T3 is greater than the trailing end thickness T4.

Embodiments of the present invention are described above that provide the housing 22 (FIG. 1) with the label zone 76 (FIG. 2), including the contoured taper curves 82, 84 (FIG. 2), and the drive zone 106, including the contoured taper curves 112, 114, such that the housing can be molded with less material and still provide sufficient durability. For example, in the embodiments described above relative to the label zone 76 and the drive zone 106, a reduction in polymer material employed in molding the housing 22 has been calculated to range from about a 5% material reduction to about a 12% material reduction compared to conventional diskette housings. Thus, an approximately 10% lighter housing 22 is achieved that provides substantially the same durability and rigidity of a heavier, conventional housing.

Figure 6:
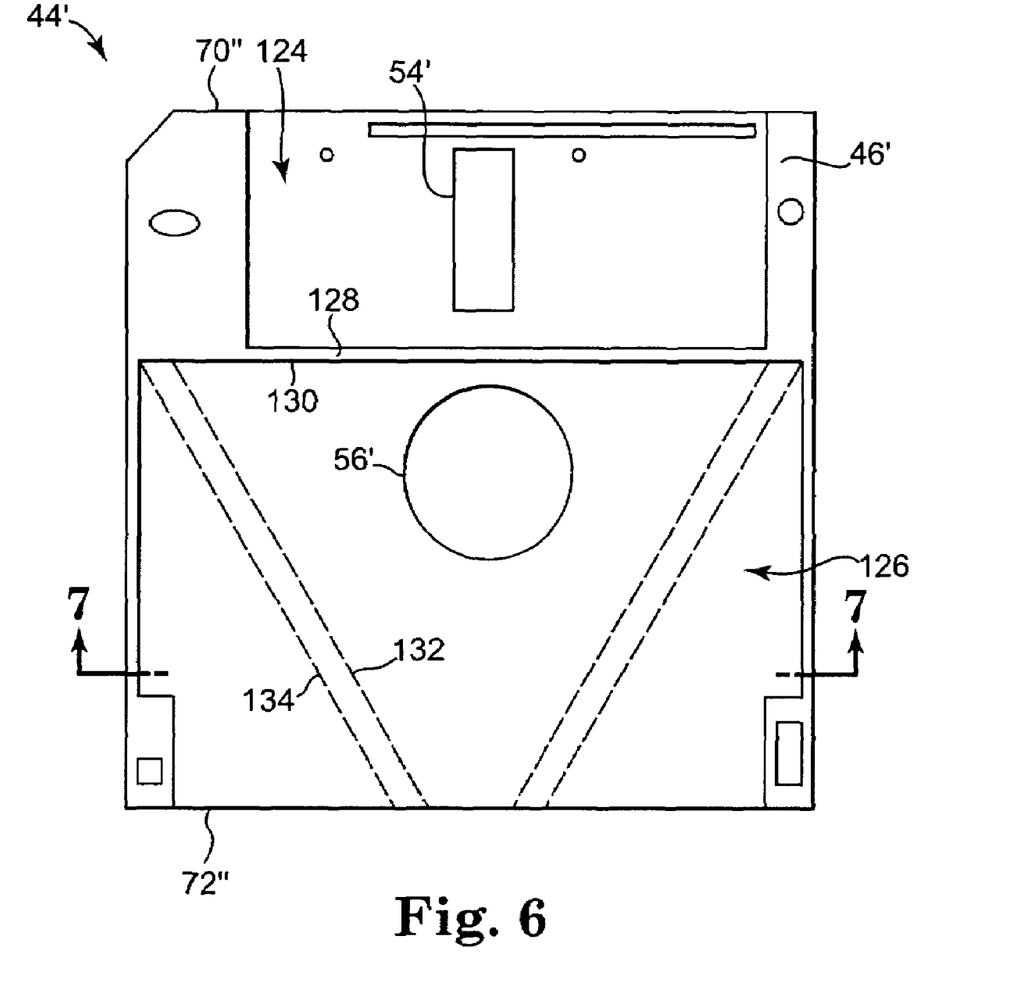
FIG. 6 illustrates a top plan view of an exterior surface of a second housing section according to one embodiment of the present invention.

FIG. 6 illustrates a top plan view of an exterior surface 46' of a second housing section 44' according to another embodiment of the present invention.

Figure 7:
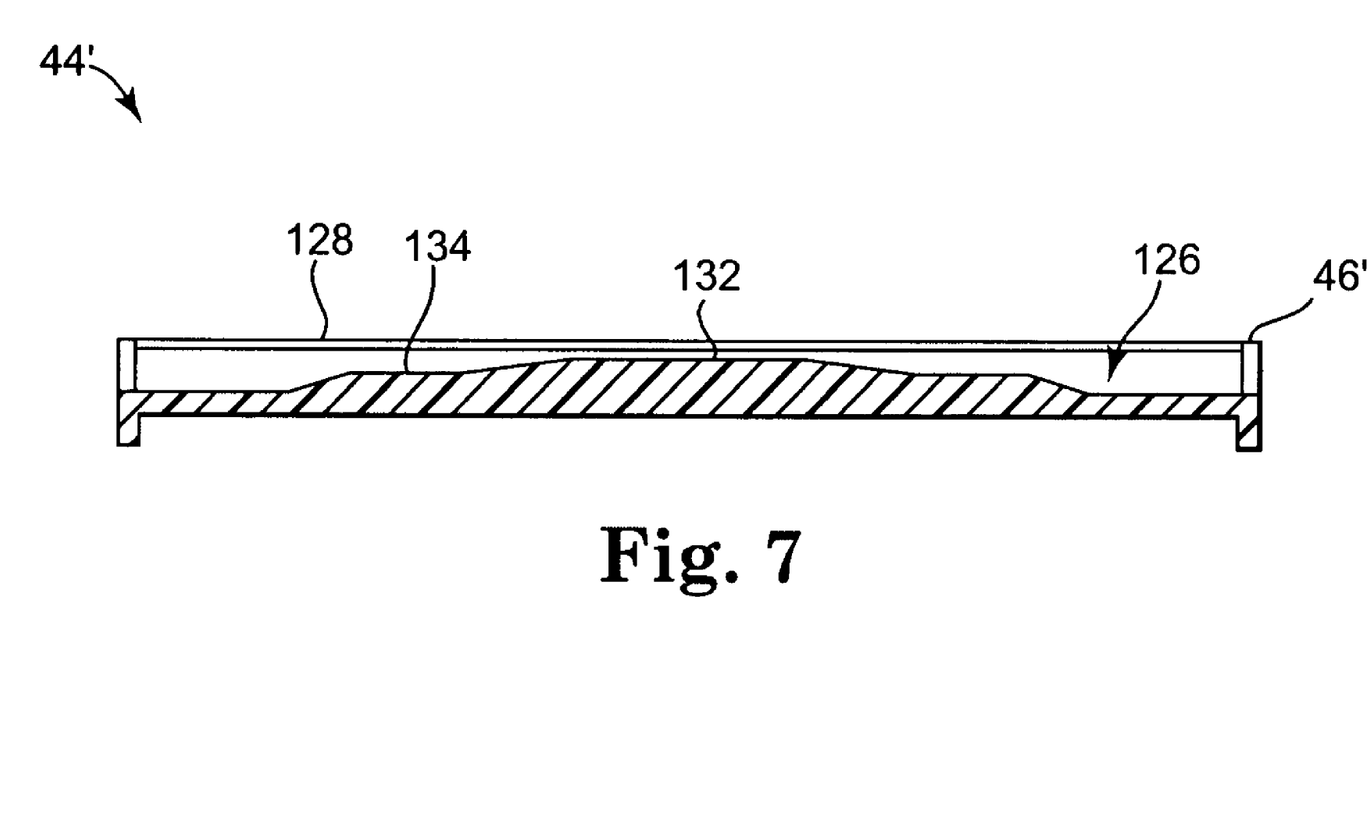
FIG. 7 illustrates a cross-sectional view of the second housing section illustrated in FIG. 6.

The second housing section 44' defines a leading end 70" and a trailing end 72" opposite the leading end 70". In one embodiment, the exterior surface 46' includes a base shutter zone 124, a drive zone 126, and a base rib 128 separating the base shutter zone 124 from the drive zone 126. In one embodiment, the base shutter zone 124 is recessed relative to the base rib 128, and the drive zone 126 is recessed relative to the base rib 128 and defines a tapered thickness as best illustrated in FIG. 7. In this regard, the base shutter zone 124 defines a base window 54', and the drive zone 126 defines a drive window 56'. As illustrated, one embodiment of the invention provides the base rib 128 extending parallel to the leading end 70" of the second housing section 44'.

In one embodiment, the base shutter zone 124 is integrally formed into the exterior surface 46' of the second housing section 44'. In this regard, the base shutter zone 124 defines a region of reduced thickness relative to the base rib 128 in an area adjacent to the leading end 70". As a point of reference, the base rib 128 is similar in structure to the base rib 108 (FIGS. 4 and 5).

In one embodiment, the drive zone 126 is integrally formed into the second housing section 44'. In this regard, the drive zone 126 defines a region of reduced thickness relative to the base rib 128. In one embodiment, the drive zone 126 defines a first peninsula 132 and a second peninsula 134, and the peninsulas 132, 134 vary in thickness in an area between the base rib 128 and the trailing end 72". Although two peninsulas are illustrated, the drive zone 126 can define one, or alternately, more than two peninsulas of varying thickness in an area between the base rib 128 and the trailing end 72".

In one embodiment, at least one of the peninsulas 132, 134 define a region of constant thickness in the drive zone 126. For example, in one embodiment, the first peninsula 132 defines a uniform thickness ranging from about 0.025 inch to 0.028 inch, the second peninsula 134 defines a uniform thickness ranging from about 0.022 inch to 0.025 inch, a base land 130 defines a uniform thickness of between 0.025 inch and 0.035 inch, and the second housing section 44 adjacent to the trailing end 72" outside of the peninsulas 132, 134 ranges from about 0.021 inch to about 0.025 inch in thickness.

In other embodiments, the peninsulas taper in thickness from a thickness of about 0.028 inch adjacent to the base land 130 to about 0.025 inch in a region adjacent to the trailing end 72". For example, in one embodiment, the peninsulas 132, 134 are similar to the contoured taper curves 82, 84 (FIG. 2). Generally, the peninsulas 132, 134 represent a streamline of polymer flow, that when cooled, form a selected and controlled variation in thickness of polymer within the drive zone 126.

Embodiments of the present invention provide peninsulas of varying thickness and/or tapering thicknesses formed in a label zone of the first housing section 42 (i.e., a cover) in a manner similar to that described above for the second housing section 44'.

FIG. 7 illustrates a cross-sectional view of the second housing section 44' according to one embodiment of the present invention. In one embodiment, the base rib 128 is a rib as defined above and separates the base shutter zone 124 from the drive zone 126.

In one embodiment, the base rib 128 extends across the width of the second housing section 44', and the peninsula 132 is recessed relative to the base rib 128. In one embodiment, the peninsula 134 is recessed relative to the base rib 128 and relative to the peninsula 132. In one embodiment, a smooth linear transition of polymer flow extends between the peninsulas 132, 134. In another embodiment, the peninsulas 132, 134 are connected by a radiused curve that smoothly extends between the peninsulas 132, 134.

With additional reference to FIG. 6, the peninsulas 132, 134 define a leading edge of polymer that extends longitudinally along the drive zone 126. In one embodiment, the peninsula 132 defines a local maximum of thickness within the drive zone 126. That is to say, the peninsula 132 defines a maximum thickness in the region of the drive zone 126. In this manner, the peninsula 132 is relatively thicker than the peninsulas 134. Thus, the peninsulas 132, 134 define boundaries of regions of relatively different thickness relative to other portions of the drive zone 126, and combine to reduce the occurrence of short shots of polymer when forming bases and covers of housing 22.

Figure 8:
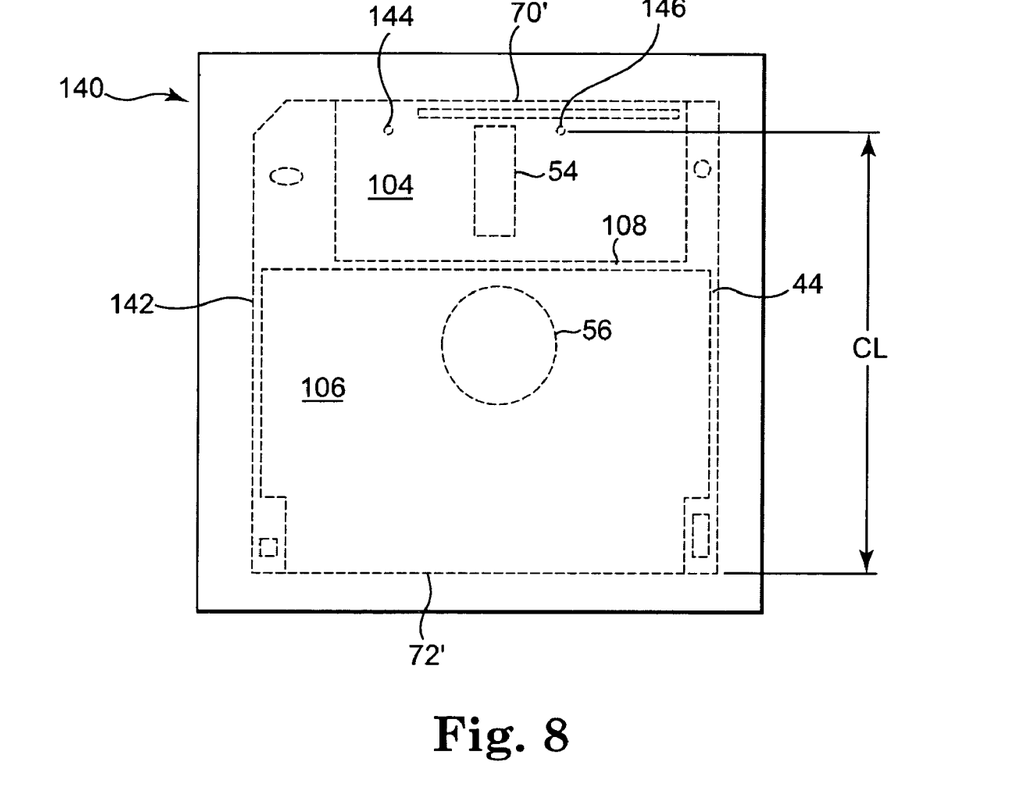
FIG. 8 illustrates a top plan view of a polymer injection mold according to one embodiment of the present invention.

FIG. 8 illustrates a top plan view of a mold 140. suitable for polymer injection molding bases 44 according to one embodiment of the present invention. The mold 140 defines a cavity 142 and polymer gates 144 and 146 that communicate with the cavity 142. In one embodiment, the cavity 142 is configured to produce molded bases 44 (FIG. 4) of the housing 22 (FIG. 1). In another embodiment, a separate mold includes a separate cavity configured to mold covers 42 of the housing 22. In general, the mold 140 is liquid cooled to enable rapid cycling of molded parts, and for simplicity of description, this liquid cooling feature is not illustrated.

With additional reference to FIGS. 4 and 5, the cavity 142 is configured to injection-mold bases 44 with a reduced incidence of short shots. Short shots are undesired holes that occur in molded articles when the injected polymer is impeded from freely flowing throughout a length of the cavity to fill the mold. Polymer flow can be impeded, and short shots formed, when the polymer is forced down too long a path length and through too narrow a gap space. One mechanism to reduce the occurrence of short shots is to increase the mold pressure, but this solution provides only a "stop-gap" response that itself creates other challenging molding issues. Thus, it is desirable to address the short shot phenomenon that is related to a length-to-thickness (L/t) ratio (in the nomenclature of polymer molding).

For example, a length of the cavity 142 (i.e., cavity length CL in FIG. 8) is defined as the distance between the gates 144, 146 and the trailing end 72'. It has been observed that a ratio of CL to the part thickness, for example thickness T4 (FIG. 5), of about 100 or more can potentially produce short shots. With this in mind, the cavity 142 is configured to provide contoured taper curves 112, 114, or peninsulas 132, 134, and the mold 140 includes enhanced polymer gates 144, 146, such that a polymer flow will uniformly fill the cavity 142 without short shots for ratios of CL to T4 of greater than 150 in/in.

In one embodiment, the polymer gates 144, 146 are uniform one to the other and define an entrance diameter of between about 0.028 to 0.040 inches, although other gate dimensions are also acceptable. During injection molding, the pressure in the polymer gates 144, 146 is between about 3,000 to 10,000 psi. Polymer is injected into the polymer gates 144, 146 and the cavity 142 is configured to distribute the polymer within the mold to form the base 44.

As described above in FIG. 4, the base shutter zone 104 is thinner than the base rib 108, and the drive zone 106 is thinner than the base rib 108 and tapers between the base rib 108 and the trailing end 72'. In general, the efficient molding of thinner housing sections of a data storage diskette has in the past been challenging. However, it has been surprisingly discovered that a structure of the cavity 142 corresponding to, for example, the structure of the bases 44 and 44' described above, permits molding of bases 44 having a respective drive zone 106/126 at a cycle time of about 3-6 seconds with an absence of short shots.

For example, during molding of bases 44 with styrene polymer, gate pressures at gates 144, 146 range between about 5,000 to 7,000 psi, and the mold pressure near the trailing end 72' is about 500 to about 2,000 psi. Injection molding the base 44 through the two gates 144, 146 produces a leading edge of polymer resulting in contoured tapered curves 112, 114 (FIG. 4). In this manner, bases 44 of the housing 22 are formed without short shots and include the tapered drive zone 106 that employs less polymer than previously required in the former injection molding dies.

In one embodiment, a styrene base 44 is molded having a cycle time of about 4 seconds, and the pressure at gates 144, 146 is about 6000 psi.

In other embodiments, a styrene cover 42 is molded having a cycle time of about 4 seconds, and the pressure at gates 144, 146 is about 6000 psi.

Although specific embodiments of preferred diskette housing information fields have been illustrated and described, it will be appreciated by those of ordinary skill in the art that a wide variety of alternate and/or equivalent implementations could be substituted for the specific embodiments shown and described without departing from the scope of the present invention. Those with skill in the chemical, mechanical, electromechanical, electrical, and computer arts will readily appreciate that the present invention can be implemented in a wide variety of embodiments. This application is intended to cover any adaptations or variations of diskette housings having tapered label surfaces and/or drive surfaces recessed relative to an exterior surface rib. Therefore, it is manifestly intended that this invention be. limited only by the claims and their equivalents.

What is claimed is:

1. A data storage diskette comprising:
    a housing including:
        a base defining an exterior surface including:
            a base shutter zone that defines a base window,
            a drive zone that defines a drive window,
            a base rib separating the base shutter zone from the drive zone, the drive zone being recessed relative to the base rib;
        a cover mated to the base and defining a cover window aligned with the base window; and
    a media disk enclosed within the housing.

2. The data storage diskette of claim 1, wherein the base rib extends parallel to a leading end of the base between the base window and the drive window.

3. The data storage diskette of claim 1, wherein the base shutter zone is recessed relative to the base rib.

4. The data storage diskette of claim 3, wherein the base rib separates the recessed base shutter zone from the recessed drive zone.

5. The data storage diskette of claim 1, wherein the base rib extends from about 0.007 inch to about 0.014 inch above the drive zone.

6. The data storage diskette of claim 1, wherein the drive zone tapers in thickness from the base rib to a trailing end of the base.

7. The data storage diskette of claim 6, wherein the drive zone tapers across at least one non-linear contoured taper curve of polymer that extends from the base rib to the trailing end of the base.

8. The data storage diskette of claim 1, wherein the cover defines an exterior surface that includes a cover rib extending parallel to a leading end of the cover and a tapered label zone, the tapered label zone tapering in thickness from the cover rib to a trailing end of the cover.

9. The data storage diskette of claim 8, wherein the cover rib separates a cover shutter zone from the tapered label zone.

10. The data storage diskette of claim 8, wherein the cover rib extends from about 0.007 inch to about 0.014 inch above a cover shutter zone.

11. The data storage diskette of claim 8, wherein the tapered label zone tapers in thickness linearly from the cover rib to the trailing end.

12. The data storage diskette of claim 8, wherein the tapered label zone defines regions of contoured taper curves, the contoured taper curves extending from the cover rib to the trailing end.

13. The data storage diskette of claim 8, wherein the tapered label zone defines a land thickness adjacent to the cover rib of about 0.023 inch to about 0.035 inch and a thickness at the trailing end of about 0.024 inch.

14. The data storage diskette of claim 8, wherein at least one of the drive zone and the tapered label zone define at least one peninsula region that defines a relative maximum of thickness within a respective one of the drive zone and the tapered label zone.

15. A data storage diskette including a leading end and a trailing end, the data storage diskette comprising:
   a housing defining:
      a base defining a base window adjacent to the leading end and a drive window;
      a cover mated to the base and defining an exterior surface including:
         a cover shutter zone that defines a cover window aligned with the base window,
         a cover rib extending parallel to the leading end,
         a tapered label zone recessed relative to the cover rib and tapering in thickness from the cover rib to the trailing end; and
   a media disk enclosed within the housing.

* * * * *